Patented Feb. 6, 1923.

1,444,548

UNITED STATES PATENT OFFICE.

EUGENE MÁRKUS, OF BUDAPEST, HUNGARY.

PROCESS OF MANUFACTURING LEATHER FROM INTESTINES.

No Drawing. Application filed November 28, 1921. Serial No. 518,381.

*To all whom it may concern:*

Be it known that I, EUGENE MÁRKUS, a subject of the Kingdom of Hungary, residing at 19 Vas utca, Budapest, Hungary, have invented certain new and useful Improvements in Processes of Manufacturing Leather from Intestines, of which the following is a specification.

This invention relates to the manufacture of leather or a leatherlike product from animal intestines and consists essentially in at first submitting the cleansed intestines to a particular preparatory procedure in order to free the cellular fibres as completely as possible from the glutinous substances and soluble salts, then filling the evacuated cells and their interstices with insoluble precipitates, the latter being subsequently fixed by the introduction of such chemical compounds as will combine with the substance of the cells. The product thus obtained shows, in appearance as well as in its most important properties and possibilities of use, the characteristic features of real leather, viz, the skinny properties disappeared; the product remains durable even in a moist condition, and, when dried, it will not become stiff and horny but flexible and sufficiently extensible without being too elastic; it is adapted to be sewn, glued, varnished, pressed, calendered, etc., whereas animal intestines when tanned in the manner hitherto known give a more or less parchmentlike product shrinking in the direction of the longitudinal fibres.

The preparatory operation of evacuating the cells is best effected by flowing water which is led longitudinally to the fibres. In about 24 to 48 hours practically all the soluble salts and glutens are removed. The intestines are now brought in an alkaline bath, for instance in a 5 per cent. solution of soda, in which they are mechanically treated by rubbing, kneading, brushing, milling or squeezing in order to ungrease and cleanse them thoroughly. Solutions of a half hard soap may be added to the alkaline bath. The alkaline liquor is then pressed out from the powerfully swollen intestines preferably between rolls which do not allow but a moderate shrinkage of the evacuated cells.

The filling of the empty cellular fibres with insoluble precipitates is effected by steeping the intestines in a series of solutions which by mutual reactions of the dissolved agents give such precipitates. I prefer to introduce different sorts of precipitates, as I have found that in this way a greater quantity of precipitates may be lastingly incorporated than by the introduction of a single sort of precipitate. Accordingly, I employ baths of the following solutions, each containing about 3 to 10 per cent of the respective agent and being allowed to act for 4 to 8 hours on the intestines; oxalate of ammonium, chloride of calcium, sulphate of ammonium, chloride of barium. Oxalate of ammonium and chloride of calcium give a precipitate of oxalate of calcium. By the action of the chloride of barium on the sulphate of ammonium imbibed in the preceding bath, sulphate of barium is precipitated. The precipitate of sulphate of barium which has a very fine and rounded granulation is wedged in between the grains of the other precipitate which is coarse-grained and has polyhedral grains. The intestines leaving the last bath are examined, and, if the quantity of precipitates taken up is not found to be sufficient, the whole series of baths may be repeatedly employed.

It was found that the dissolved agents penetrate also into the interior of the cells. Similarly as flour fills a sack, the evacuated cells of the intestinal tissue are filled with the several precipitates. However, the precipitates might partly escape in the working up of, or in the use of the article made from, the intestinal leather. Therefore, I fix the incorporated precipitates by a further treatment consisting in the introduction of chemical compounds which will combine with the substance of the cells, thus forming insoluble compositions which will envelop the filled cells and prevent the escape of the precipitates. Such compounds are the double salts forming out of heavy metallic salts, e. g. ferric salts, and potassium ferro-cyanide. Accordingly, I steep the intestines leaving the last of the former series of baths in a bath of ferric chloride, and thereafter in a bath of potassium ferro-cyanide.

The intestinal leather thus obtained is then dried at some airy and not too hot place. In order to render it yet more pliable, it may be subjected to a further treatment. Saturation with glycerine is known to impart a greater degree of pliability to skins, leather or other fibrous materials. I found that also a solution of lactates, such as lactate of sodium, in combination with an oily substance gives the same effect.

After being dried again, advantageously between frames, the product is ready for use and may be worked up as leather. The incorporated filling and fixing bodies generally impart some coloring to the product, but it will be understood that the well-known dyeing or coloring methods usual in the leather or textile industry may be employed to obtain any further dyeing effect desired.

I am aware that it has already been proposed to tan the intestines of animals. I am also aware that tawing by the formation of an insoluble precipitate in the fibres of a skin or membrane is not novel per se, and that a process of tanning skins is known wherein silica is incorporated with the constituent elements of the skin. Accordingly, I do not claim such singular steps of the process as above described. The essence of my invention consists in the combination of three main operations i. e. first, thorough evacuation of the cells, second, filling with insoluble precipitates, third, fixation of the incorporated precipitates by the introduction of chemicals combining with the cellular substance. It is the combination of these steps in the above succession which leads to a really leatherlike product.

I claim:

1. A process of manufacturing leather or a leatherlike product from intestines which consists in removing the soluble salts and glutens by washing, then filling the evacuated cells of the fibrous tissue and their interstices with insoluble precipitates, then fixing said precipitates by the introduction of compounds adapted to be bound by the substance of the cells.

2. A process of manufacturing leather or a leatherlike product from intestines which consists in removing the soluble salts and glutens by washing, then filling the evacuated cells of the fibrous tissue and their interstices with a series of insoluble precipitates of different sort, then fixing said precipitates by the introduction of compounds adapted to be bound by the substance of the cells.

3. A process of manufacturing leather or a leatherlike product from intestines which consists in extracting the soluble salts and glutinous substances by flowing water led longitudinally to the fibres, then mechanically treating the intestines in an alkaline bath and pressing out the ungreased and swollen fibrous tissue, then filling the evacuated cells and their intestines with insoluble precipitates, and fixing said precipitates by the introduction of compounds adapted to be bound by the substance of the cells.

4. A process of manufacturing leather or a leatherlike product from intestines which consists in extracting the soluble salts and glutens by flowing water led longitudinally to the fibres, then mechanically treating the intestines in an alkaline bath and pressing out the ungreased and swollen fibrous tissue, then bringing it in succession into baths of the following solutions—oxalate of ammonium, chloride of calcium, sulphate of ammonium, and chloride of barium, and then with successive baths of ferric chloride, and potassium ferro-cyanide.

In testimony whereof I have hereunto set my hand in the presence of two subscribing witnesses.

EUGENE MÁRKUS.

Witnesses:
D. ERNST PREUSZ,
JULIUS SCHWARZ.